Nov. 10, 1970 — A. LEFORT — 3,538,678

BOTTLE STOPPERING MACHINE

Filed Feb. 16, 1968 — 3 Sheets-Sheet 1

Inventor
Alfred Lefort
By Cushman, Darby & Cushman
Attorneys

Nov. 10, 1970   A. LEFORT   3,538,678
BOTTLE STOPPERING MACHINE
Filed Feb. 16, 1968   3 Sheets-Sheet 2
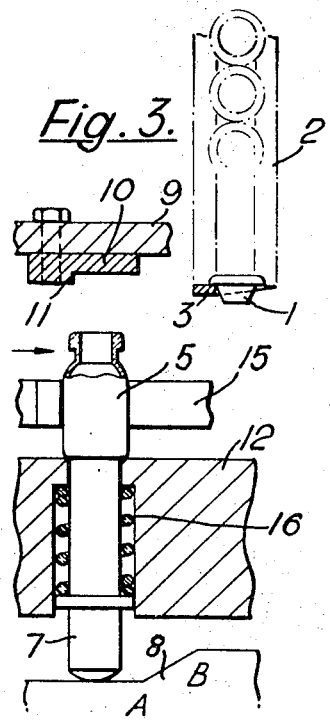
Fig. 3.
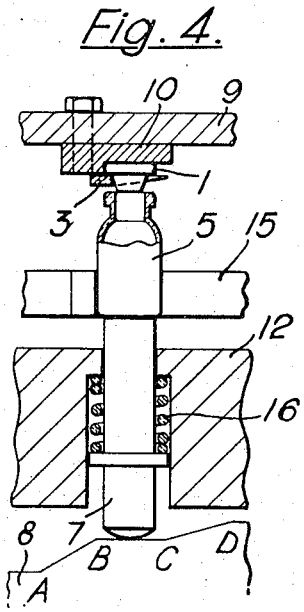
Fig. 4.
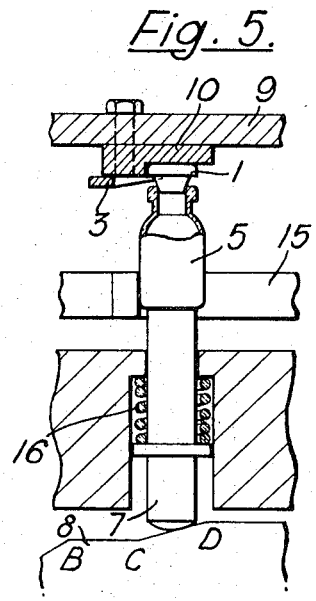
Fig. 5.
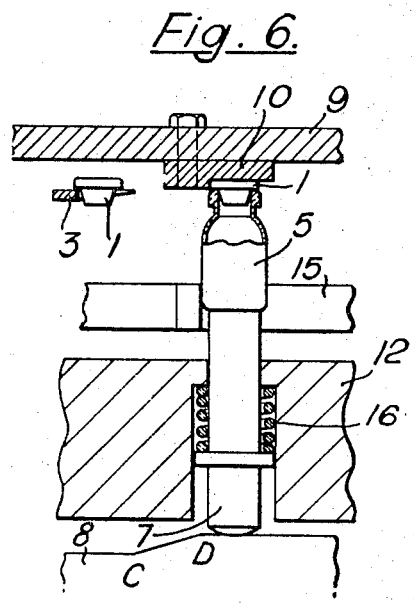
Fig. 6.
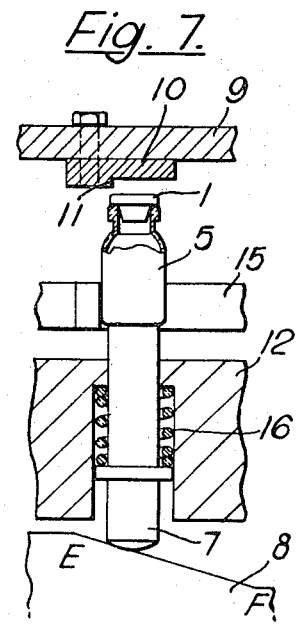
Fig. 7.
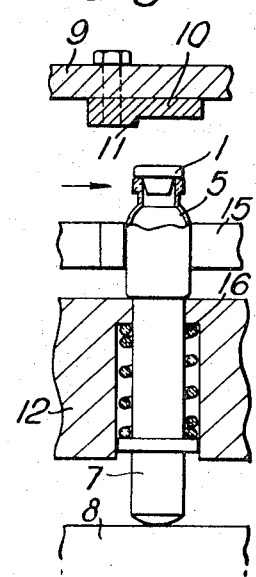
Fig. 8.
Fig. 9.
Inventor
Alfred Lefort
By Cushman, Darby & Cushman Nov. 10, 1970  A. LEFORT  3,538,678
BOTTLE STOPPERING MACHINE Filed Feb. 16, 1968  3 Sheets-Sheet 3

Inventor
Alfred Lefort
By
Cushman, Darby & Cushman

United States Patent Office 3,538,678
Patented Nov. 10, 1970

3,538,678
BOTTLE STOPPERING MACHINE
Alfred Lefort, Brunoy, France, assignor to Rhone-Poulenc S.A., Paris, France, a French body corporate
Filed Feb. 16, 1968, Ser. No. 705,964
Claims priority, application France, Feb. 28, 1967, 96,869
Int. Cl. B67b 1/04
U.S. Cl. 53—319                                1 Claim

ABSTRACT OF THE DISCLOSURE

The specification describes a machine for applying stoppers to bottles, in which the bottles are fed continuously to and from peripheral notches in the central plate of a turntable rotating about a vertical axis. An upper plate on the turntable carries extractors which remove the stoppers from a support at the end of a guide channel, while push rods, carried by a lower plate of the turntable and lifted by an annular cam, raise a bottle to engage a stopper in the support.

---

The present invention relates to a bottle stoppering machine.

Many types of stoppering machines are already known. Changing-over from corkstoppers to stoppers made of rubber or plastics material has necessitated a complete change in the apparatus used. Nevertheless, the existing machines still comprise as active elements parts which move in reciprocating manner and this limits the rates of production permitted, and necessitates careful adjustment.

According to the invention there is provided a stoppering machine for applying stoppers to bottles, such machine including a rotatable turntable having a central peripherally notched plate, a first plate on one axial side of said central plate carrying a plurality of extractors and a second plate on the other axial side of said central plate carrying a plurality of push members, one extractor and one push member being in axial alignment with each notch of the central plate, a stopper support adapted to receive stoppers from a stopper supply channel and having an opening in axial alignment with the periphery of the central plate, such opening being disposed to discharge stoppers in the direction of rotation of the turntable, upon engagement of a stopper in said support by one of said extractors, and a fixed cam positioned to effect axial displacement of said push members, upon rotation of the turntable, to move the bottle in each notch in turn to engage a stopper in said support.

The machine of the invention is very suitable for stoppers moulded from resilient material, the said machine operating continuously and comprising no parts subjected to reciprocating movement. It is particularly well suited to operating with bottles of small capacity, and permits of maintaining high rates of production.

In order that the invention may more readily be understood, the following description is given, merely by way of example, reference being made to the accompanying drawings, in which:

FIGS. 3, 4, 5, 6, 7 and 8 are fragmentary sectional views, schematically illustrating the operation of the machine;

FIG. 9 is a developed side elevation of the annular cam of the apparatus of FIGS. 1 to 8.

Figure 1:
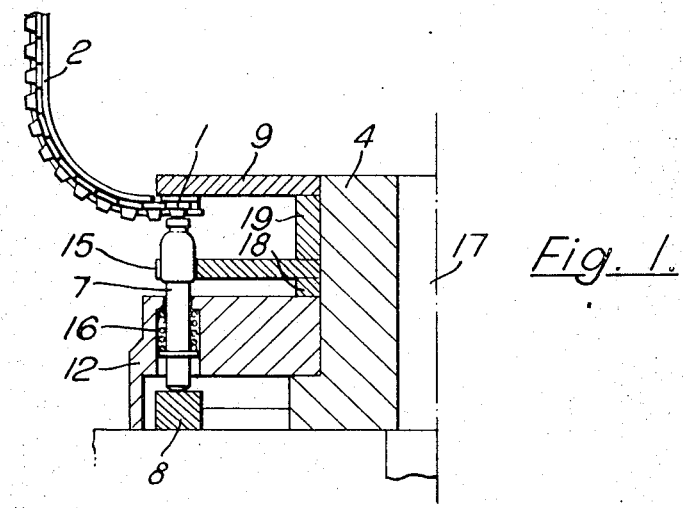
FIG. 1 is a fragmentary sectional view of one embodiment of machine according to the invention, taken along the line I—I of FIG. 2.

The machines illustrated in the drawings are intended to operate with stoppers which comprise a portion, known as the skirt, which engages in the neck of the bottle, and an upper portion or cap, which engages on the upper end of the neck of the bottle.

Figure 2:
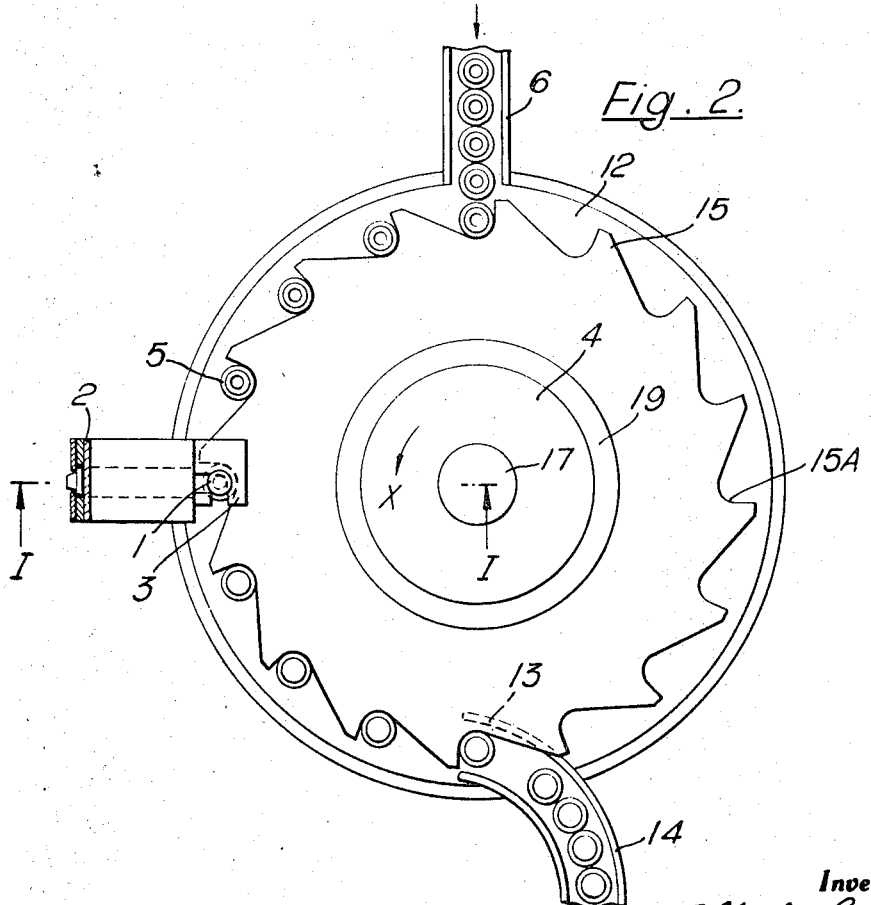
FIG. 2 is a top plan view of the machine of FIG. 1.

In FIGS. 1 and 2, the machine comprises a turntable hub 4, mounted on a vertical axis for rotation by a drive shaft 17 in the direction indicated by the arrow X in FIG. 2. The turntable includes a central horizontal plate 15 provided with a plurality of peripheral notches 15A of a size to receive a bottle 5 from a stationary bottle feed channel 6. Annular spacers 18 and 19 locate in axially space relation with respect to the plate 15, a first or upper plate 9 and a second or lower plate 12, the three plates 15, 9 and 12 all rotating with the turntable hub 4. Extractors 10, recessed at one side to provide an abutment 11, are carried by the upper plate 9 in vertical alignment with the axes of the bottles 5 in the notches 15A of the central plate 15. Also in alignment with the axes of these notches are push rods 7 carried by the lower or second late 12, these push rods being urged downwardly by springs 16, against the upper surface of an annular cam 8.

A stopper guide channel 2 is provided with a slot to accept the upper or cap portion of the stopper, with the skirt depending downwardly therefrom. The guide channel 2 terminates in a stopper support 3, which is provided with an opening which opens in the direction of rotation of the turntable.

In operation, stoppers 1 are fed by the channel 2 to the support 3, in which position they are axially aligned with bottles 5 moving in the notches 15A of the central plate 15. Each bottle is supported on one of the push members 7, which, as illustrated in FIGS. 3 to 8 is caused to ride along the surface of the cam 8. In the position illustrated in FIG. 3 the extractor 10 is approaching the support 3 which is carrying a stopper 1. The lower end of the push rod then rides up the portion AB of the cam 8 and a bottle 5 is pushed upwardly so that the skirt of the cap 1 just enters into the neck of the bottle (FIG. 4). The turntable then rotates to the position illustrated in FIG. 5, in which the push rod 7 rides up the portion CD of the cam as the extractor removes the cap from the opening in the stopper support 3. As illustrated in FIG. 6, the push rod rises to the uppermost portion DE of the cam to push the bottle firmly up, so that the stopper is perfectly engaged in the neck thereof. By this time a further stopper is located in the stopper support 3 ready for the next bottle. As the first bottle continues to the position illustrated in FIGS. 7 and 8, the push rod 7 slides down the portion EF of the cam 8 to withdraw the bottle from the extractor 10.

The bottle, complete with stopper, then proceeds to the stationary deflector 13, which deflects the bottle into the outlet transfer channel 14.

If desired, the assembly may be provided with safety devices (not shown), such as devices which block the descent of the stoppers if there are no bottles to be stoppered, and a device which stops the movement of the driving shaft 17, if the turntable is blocked by a bottle lying down, or by any other foreign body. This may be achieved for example by automatic declutching controlled by a micro-switch.

The illustrated machine of the invention affords many advantages, in particular:

(1) Known automatic stopping machines have a reciprocating movement at least in one of their phases, whereas the machine of the present invention is entirely rotational without any impacts and without any reciprocating movement.

(2) Engagement of stoppers by grippers or any other system involves a mechanism with complicated movements which require precise adjustment. The engagement of the stoppers in the apparatus of this invention is simple, the extractors carrying the stoppers along during their rotation.

(3) The considerable dead periods due to any kinematic mechanism for engaging and positioning stoppers by articulated levers are not necessary in the machine of the invention.

(4) With the machine of the invention bottles are not immobilized at the stoppering station to receive their stopper, but may travel in an absolutely continuous manner.

It will be apparent that the stoppers may be made of rubber or plastics material, may be solid or hollow, and may be made in one piece or several pieces. Any suitable size of cap or skirt may be employed.

While the push members 7 have been illustrated with a return spring, in certain circumstances the spring may be omitted, when the bottles are of a sufficient weight, or the rate of operation is sufficiently low. If desired, the push members may be moved positively downwardly by an element on the push members engaging in a cam groove.

The push members may be solid as illustrated or may be made in two telescopic parts with a calibrated internal spring so as to compensate for difference in height between bottles. Moreover the push members may be provided with a cam following roller at their lower end.

The embodiment of apparatus illustrated with reference to FIGS. 1 to 8 is designed to serve only one stoppering station, and may be incorporated in a filling and packing production line, and may be connected in the upstream and downstream parts of such production line by two diametrically opposite conveyor belts feeding the inlet channel 6 and removing stoppered bottles from the outlet channel 14 respectively.

Figure 10:
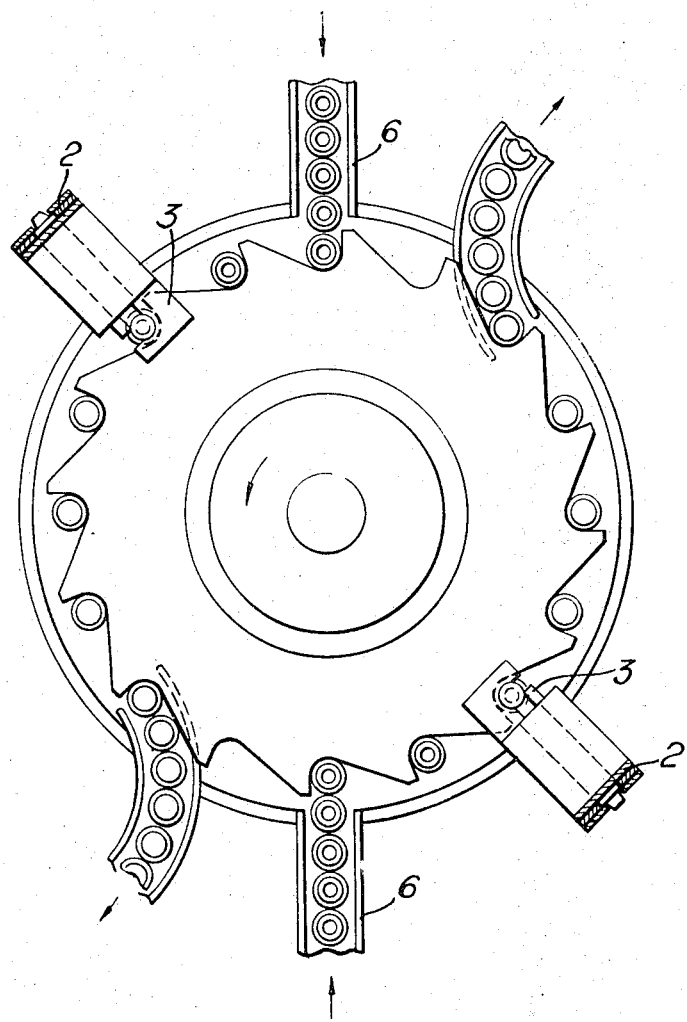
FIG. 10 is a view similar to FIG. 1 of a second embodiment.

The stoppering assembly instead of comprising a single stoppering station may comprise two stations which are preferably diametrically opposite one another as illustrated in FIG. 10. The bottles arrive from two supply devices which are preferably diametrically opposite one another and leave by substantially diametrically opposite paths. It is not recommended to provide more than two stations per turntable.

The apparatus according to the invention can be adapted to any kind of bottle, but it is preferable for these bottles to be of circular cross-section or regular polygonal cross-section. The machine may be constructed to receive a specific type of bottle having diameters, heights and stoppers of different sizes. The diameter of the push members 7 having been fixed for the mean diameter of various bottles, without changing the turntable hub 4 or the lower plate 12 it is sufficient to arrange the upper plate 9 with the appropriate extractors for the stoppers, the plate 15 with appropriate sized notches and the annular spacers 18 and 19 of a suitable height. The channel 2 and support 3 are then adjusted vertically in accordance with the position of the upper plate 9.

The following example illustrates the invention:

EXAMPLE

The apparatus is designed for 5 cc. bottles of the "necked" type, cylindrical in shape with a height of 41.5 mm. and a diameter of 20 mm.

The turntable is as illustrated in FIGS. 1, 2 and 3. It is made of appropriate materials; the plate 12 is made of cast iron, plate 15 is made of "Duralumin," plate 9 and members 4 and 17 are made of steel. The push members 7 and the cam 8 are made of hardened steel; continuous lubrication is provided for the push members and the cam. The number of notches is 16. The assembly rotates at 12½ revolutions per minute to stopper 200 bottles per minute.

I claim:

1. A bottle stoppering machine of the type comprising a turntable rotatable about an axis, means for rotating said turntable in a given direction about said axis, an upper plate and a lower plate to said turntable, bottle pushers slidable in said lower plate, a fixed circular cam cooperating with said bottle pushers effective to cause raising and lowering of said bottles, means fixed to the upper plate vertically above each bottle pusher for forcing the stopper into the bottle when the latter is pushed thereagainst; a stopper supply furnished with a chute maintaining the stoppers by their caps, and means for positioning the stopper vertically above a bottle pusher, the improvements consisting in:

(a) a notched central plate co-axial with said turntable and secured thereto;
(b) a periphery to said central plate;
(c) means defining a plurality of bottle receiving notches in said periphery, a notch being co-axial with each pusher, and the notches being shaped to engage and entrain a bottle therein;
(d) a stopper support, receiving stoppers from said supply chute effective to locate stoppers co-axially with said bottle pushers;
(e) a plurality of extractor means mounted on said first plate, one in axial alignment with each said bottle receiving notch;
(f) an abutment on each of said extractor means so that said pushers push said stopper against said abutment to stopper the bottle; and
(g) an opening on said support in axial alignment with the periphery of said central plate and disposed to discharge stoppers from said support in said direction of rotation of the turntable upon engagement of the stopper in said support by one of said extractor means.

References Cited

UNITED STATES PATENTS 904,763  11/1908  Dorman _____ 53—319 XR
1,782,904  11/1930  Mohler _____ 53—314 XR TRAVIS S. McGEHEE, Primary Examiner H. M. CULVER, Assistant Examiner